United States Patent [19]

McBrien et al.

[11] Patent Number: 4,981,358

[45] Date of Patent: Jan. 1, 1991

[54] MEASURING THE RELATIVE EFFECTIVE LENGTHS TRAVERSED BY COUNTERPROPAGATING BEAMS OF LIGHT

[75] Inventors: Gregory J. McBrien, Cromwell; David M. Cramp, Bristol; Winthrop H. McClure, Farmington, all of Conn.

[73] Assignee: United Technologies Corporation, Hartford, Conn.

[21] Appl. No.: 242,937

[22] Filed: Sep. 9, 1988

[51] Int. Cl.$^5$ .............................................. G01B 9/02
[52] U.S. Cl. ..................................... 356/350; 328/185
[58] Field of Search ................ 356/350, 345; 328/181, 328/183, 185; 332/30 V

[56] References Cited

U.S. PATENT DOCUMENTS

| | | |
|---|---|---|
| 2,927,280 | 3/1960 | Cumming . |
| 3,952,306 | 4/1976 | Benton .................................. 343/18 |
| 4,449,059 | 5/1984 | Dickes .................................. 329/185 |
| 4,735,506 | 4/1988 | Pavlath . |
| 4,759,629 | 7/1988 | Everest et al. . |

FOREIGN PATENT DOCUMENTS 1045361 9/1983 U.S.S.R. .............................. 328/181

OTHER PUBLICATIONS

"Transistor Sawtooth Foaming Circuit", Goodrich, RCA Technical Notes, 3-1964.
"Double Closed-Loop Hybrid Fiber Gyroscope Using Digital Phase Ramp", by H. C. Lefevre et al.
"Closed-Loop Fiber-Optic Gyroscope with a Sawtooth Phase-Modulated Feedback", in Optics Letter, vol. 10, Jun. 1985, by A. Ebberg et al.

Primary Examiner—Samuel Turner

[57] ABSTRACT

A sawtooth voltage is applied to an integrated optic phase modulator by means of a high impedance variable current source in response to a charge rate control signal. The phase modulator's capacitance accumulates the charge which manifests a voltage comprising the sawtooth signal. The sawtooth signal is also provided to a comparator which in turn provides a discharge signal upon detecting the sawtooth voltage as being greater than a selected reference signal magnitude. The discharge signal is provided to a means for discharging the accumulated charge from the capacitance of the integrated optic phase modulator. A compensating resistor may be connected between the current source and the phase modulator to automatically correct for sawtooth overshoot. Various data extraction techniques are disclosed, without limiting the invention since others may be used, including counting sawtooth resets, among others, and using a current splitter to store charge separately from the serrodyne modulation circuit and relating separately stored charge to angle or rate.

5 Claims, 4 Drawing Sheets

MEASURING THE RELATIVE EFFECTIVE LENGTHS TRAVERSED BY COUNTERPROPAGATING BEAMS OF LIGHT

TECHNICAL FIELD

This invention relates to an integrated optic phase modulator energized according to the serrodyne modulation technique.

BACKGROUND ART

Integrated optic phase modulators are becoming widely used for frequency shifting in many optical devices. One application for such a modulator is to energize it with a sawtooth waveform in order to effect a desired phase shift in a light signal. This may be done for closed-loop or even for open-loop control of a system. Particular applications for such a "serrodyne" driven modulator may include fiber optic gyros, communications circuits, coherent light based sensors, etc. An example of such an application (fiber optic gyro) developed by applicants is presented below, but others are available and are within the scope of the invention.

In fiber optic gyros a coherent light beam is split in two component beams which are launched into each end of an optical fiber coil to propagate in opposed directions until recombined, after traversing the coil, to form an interference phenomenon, e.g., a fringe pattern at a detector. When subjected to a rotation having a component perpendicular to the plane of the coil, a nonreciprocal (acting on one beamd but not the other) phase shift, known as the Sagnac effect, is induced between the two counterpropagating beams thus causing a change in the interference phenomenon, e.g., a shift in a fringe pattern. The magnitude and direction of the fringe shift is proportional, respectively, to the rate and sense of the rotation applied to the coil about the axis.

The Sagnac effect can be understood in layman's terms by considering two examples, first a simple case dealing with the behavior of light in a straight path and then in a rotational path.

First, consider two pickup trucks, one following the other along a highway, both at the same speed, with a man in the trailing vehicle's bed throwing a first baseball to a man standing in the leading vehicle's bed at the exact moment the trailing truck passes another man standing on the side of the road who also, at that moment, throws a second baseball to the man in the leading truck. The first baseball will travel through the air from the trailing truck to the leading truck at the common speed of the trucks plus the velocity with which it was launched. Assuming equal launch velocities and neglecting frictional effects, the second baseball will clearly lag the first due to its only having the velocity with which it was launched. Now consider the same two trucks traveling at the same constant speed along the same route again but at night. The man in the trailing vehicle has a flashlight and the man in the leading truck a light detector. Similarly, the man on the side of the road has a flashlight. As the trailing truck passes the man on the road, both flashlights are turned on. Because the speed of light in an isotropic medium is independent of the reference frame, the man with the detector will receive the two beams at the detector at the same time.

Now, for the second example. Starting with a non-light analogy to a fiber optic gyro (by which the Sagnac effect can be better distinguished for the layman), imagine a very small man standing on the edge of a rotating disc of a record player having a large metal tube on the top edge around its periphery except in the space occupied by the man. The man is holding two pistols and is standing in between the two openings of the tube. If he shoots the guns at exactly the same moment into each of the openings, quickly gets out of the way and inserts a target in the space between the openings, he can observe the two bullets exiting the tube at the same time and hitting the target simultaneously. On the other hand, if the tube is an optical fiber and he uses two flashlights and a detector instead of pistols and a target, the light beam propagating in the direction of rotation of the disc will take a longer amount of time to get to the detector than the beam in the other direction because it has further to go. Due to light by nature being independent of any reference frame, the beam in the direction of rotation has to travel a longer distance than the beam in the opposite direction. The distance for each beam is different from the length of the optical fiber by the amount the disc moved during the transit time of the particular beam. These differences may be manifested by allowing the beams to recombine so as to interfere with varying degrees of constructive and destructive interference, creating interference fringes which change their magnitude and sense according, respectively, to the speed and direction of the disc.

The phase difference between the two beams can be "nulled" by imposing a further nonreciprocal phase shift on the beams in the coil using the detector's output in conjunction with a phase modulator. Conceptually, "nulling the coil" is akin to use of a doctor's scale in which the patient's weight creates an imbalance which may be nulled by sliding various weights about until a null position is achieved, at which point the scale may be read. In fiber optic gyro applications, unlike the doctor's scale, the "patient's weight," i.e., the angular rotation rate about the gyro's axis may be changing continually. The Sagnac effect can be compensated or nulled automatically by means of a control circuit which detects the magnitude and sense of the fringe shift and provides a drive signal which drives the modulator to provide the required phase compensation to null out the shift. One can then measure the degree of phase compensation required as being directly proportional to rate.

Various modulators are known in the art including integrated-optic phase modulators. Such a modulator might typically comprise a lithium niobate crystal indiffused with titanium or might in general comprise an optical material capable of having its index of refraction changed by means of a voltage induced electric field applied thereto. The field may be applied with differing polarity in order to raise or lower the refractive index above or below the quiescent (nonenergized) index (or conceivably even some selected index above or below the quiscent index). A single modulator is typically located near or at one end of the coil in order to be in a position to shift the phase of one component beam as it enters the coil and the other as it leaves the coil. If the modulator were located midway in the coil the effect would be simultaneous to both exiting beams, and would cause no effect. However, the desired nonreciprocal effect is caused not only by the nonsymmetrical positioning of the modulator, which alone would not cause the disired effect, but by the fact that the voltage applied to the modulator is varied, typically in ramp fashion, so that a pair of light packets entering the separate end of the coil at the same time will propagate through the modulator at different time, when it has different indices of refraction. They will thus be subject to different degrees of delay.

A closed-loop drive circuit for a phase modulator for a fiber optic gyro may be viewed conceptually as causing the phase modulator to effectively either "lengthen" or "shorten" to coil (depending on the direction of rotation of the gyro) for both beams, but to different degrees in order to cause the two beams to always "see" or effectively traverse the same length of coil and exit the loop at the same time. Of couse, as discussed in the preceding paragraph, in reality there is no change in the length of the coil. Rather, the effect is accomplished by continually changing the index of refraction of a small part of the length of the loop (occupied by the modulator), thus imposing differing degrees of delay on the two beams. The magnitude the sense of the modulating voltage necessary to thus null the coil in closed-loop fashion is directly proportional to the rotation rate of the gyro. If a ramp voltage is used to energize the modulator its slope should be set up so as to change in proportion to changes in the rate of rotation of the gyro. A positive slope will indicate rotation in a direction opposite from that indicated by a negative slope.

If the index of refraction of the crystal modulator could be increased or decreased without limit and if a voltage source of infinite magnitude in both polarities were available it would be possible to increase or decrease modulation to null the coil for as long as necessary, without limit. (This would be akin, in the doctor's scale example, of the "patient'weight" increasing beyond the capabilities of the scale to measure). But of course this is not the case, and a constant magnitude sawtooth-type waveform is usually applied instead, the frequency being indicative of rate of rotation, with the slope changing polarity to indicate a change in direction of rotation.

(For an early example of a sawtooth waveform used to achieve frequency translation, see U.S. Pat. No. 2,927,280. That patent discloses the efficiency advantage of sawtooth modulation (near 100%) of a klystron versus the then prior art method of sinusoidal modulation (around 34% because of the need to use filters to reject unwanted frequencies). Although of general interest, no particular sawtooth drive circuit is disclosed in detail.

The use of a sawtooth-type waveform for modulation purposes presents certain difficulties which are in general related to the waveform's periodic discontinuity. The most important of these are the duration of the discontinuity itself and unwanted harmonics attributable to a nonzero duration of the discontinuity. Of course, it is desirable to minimize both. The deleterious influence of a finite flyback period (in a fiber optic gyro) on the proportional relation between the shift required to null the coil and the rotation rate is investigated in a letter authored by A. Ebberg and G. Schiffner appearing in the Jun. 1985 issue of *Optics Letters*, Vol. 10, No. 6, entitled, "Closed-loop fiber-optic gyroscope with a sawtooth phase-modulated feedback." In that article, it is implied that a nearly ideal sawtooth-type waveform flyback period would be about two percent of the whole period (See FIG. 6 of the letter, the accompanying caption and text on pp. 301-302).

A sawtooth generator for use in such closed-loop control circuits having a so-called, near-ideal 2% flyback period might typically comprise a capacitor, a discharge switch and a phase modulator connected in parallel across an opamp to form a dischargeable integrator responsive to a feedback signal indicative of the magnitude of the modulating voltage. The voltage across the capacitor of the integrator (appearing also across the modulator) is discharged whenever the output of the integrator is sensed by a comparator as having exceeded a selected level corresponding to the desired constant amplitude of the sawtooth. With this arrangement the frequency of the sawtooth will be directly proportional to the rate of rotation of the gyro and a digital frequency counter can be hooked up to readout the frequency which can in turn be converted to angular rate or to pure angle. However, because the phase modulator is driven by the low impedance output of the op amp, closing the switch will result in a surge of current from the output of the op amp. This surge will interfere with the discharging of the capacitor, causing unwanted harmonics and increasing the flyback period. The flyback period and the unwanted harmonics can only be minimized by using super fast op amps, which are very expensive.

Another approach which might be used in the prior art would be a closed loop version of what is shown in U.S. Pat. No. 3,952,306, issued to Benton, for generating a constant peak amplitude, variable frequency sawtooth wave. That circuit uses the output of a sweep genertor (e.g., a sawtooth generator) to drive both a current source, which charges a capacitor to provide the variable frequency sawtooth ramp, and a voltage controlled multivibrator to control the frequency at which the capacitor is discharged through a discharge circuit. The sawtooth output voltage on the capacitor is provided to a buffer amplifier in order to present a low impedance to the load.

(Also discussed in that patent is what is described as the then prior art serrodyne method of using a current source to linearly charge a capacitor and a unijunction transistor to set a threshold level and discharge the capacitor. The current source was varied in order to change the sawtooth frequency. This proved satisfactory at frequencies up to 10 kHz, however, due to the delay time of the unijunction, at frequencies above 10 kHz, a variation in amplitude occurred as the frequency was swept {see column 1, lines 20-28}).

It is well understood in the art of frequency shifting with serrodyne modulation that when the ramp is reset, a disturbance exists in the detector for the duration of the loop light propagation delay if the peak value of the sawtooth waveform of absolute phase shift does not equal an integral number of wavelengths (2 radians of phase shift) of the coherent light. In other words, the maximum amplitude of the phase modulation imposed at the end of each sawtooth period must exactly equal one or more whole wavelengths of the light propagating in the fiber coil. If the instantaneous phase modulation at the time of reset is greater or less than one coherent ligth wavelength then the counterpropagating light waves will not experience reset at exactly the same relative point in the coherent period. This would result in the modulation beginning earlier or later each coherent cycle with respect to the other, thus introducing a phase error. One suggestion to deal with this error in the phase nulled output is to gate the receiver from the error and use the signal from the ramp time to control the period of the serrodyne ramp waveform. The error signal from the reset period can also be used to control the $V_{2pi}$ threshold, in a second control loop. See "Double Closed Loop Hybrid Fiber Gyroscope Using Digital Phase Ramp," by H. C. Lefevre, P. H. Graindorge, H. J. Ariditty, S. Vatoux and M. Papuchon. According to the article, the ratio of the new period to the old period can be used to update the gyro scale factor from its initial value. Thus, scale factor drift due to inexact serrodyne modulation amplitude control can be compensated in this manner.

In a article by H. C. Lefevre et al, it is suggested that it is possible to use phase steps with a step duration corresponding to the group propagation time through the fiber sensing coil instead of an analog ramp.

Objects of the present invention include improve means for measuring the relative effective lengths traversed by counterpropagating beams of light.

According to the present invention, a current source and a capacitive integrated optic phase modulator are used in a circuit to drive said modulator, said circuit having means for measuring current provided to said modulator and said current being indicative of the relative effective lengths traversed by counterporpagating beams of light.

By using a current source and an integrated optic phase modulator as part of the drive circuit, the present invention takes advantage of the inherent capacitance of the phase modulator and generates a sawtooth voltage waveform having a relatively low amount of distortion without resorting to the use of very fast op amps. Measuring the current provided to the modulator results in an accurate measurement of the relative effective lengths traversed by counterpropagating beams of light.

These and other objects, features and advantages of the present invention will become more apparent in light of the following detailed description of a best mode embodiment thereof, as illustrated in the accompanying drawing.

BRIEF DESCRIPTION OF THE DRAWING

FIG. 2 is a composite illustration of the manner in which FIGS. 2A and 2B are to be abutted to one another in order to form a more detailed schematic diagram of a preferred embodiment of the second aspect of the present invention;

BEST MODE FOR CARRYING OUT OF INVENTION

Figure 1:
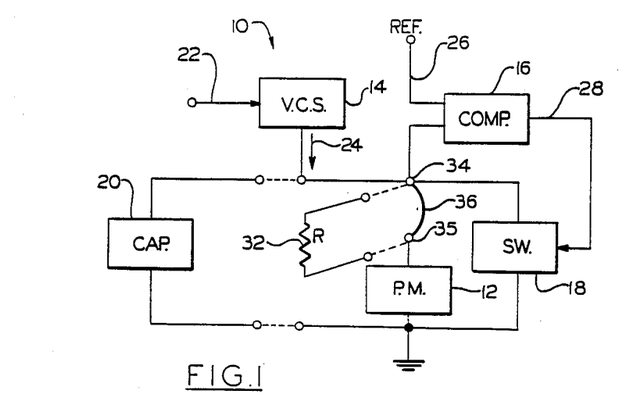
FIG. 1 is an illustration of a driver according to the present invention.

FIG. 1 illustrates a curcuit 10 for providing a ramping phase shift on light propagating through an integrated optic phase modulator 12. In addition to the phase modulator 12, the circuit comprises a high output impedance variable current source 14, a comparator 16 for measuring the voltage of the phase modulator 12 and a switch 18 or dumping charge delivered by the variable current source 14 to the phase modulator 12 and stored therein by virtue of the capacitive nature of the modulator. In addition, a capacitor 20 may be added in parallel with the phase modulator 12 in order to add additional capacitance, if desired.

A control signal on a line 22 provides a means for commanding the variable current source to provide a selected magnitude of current 24. A reference signal on a line 26 is provided to one input of the comparator 16 and the other input is taken from the phase modulator 12. When the voltage on the phase modulator exceeds the magnitude of the reference voltage on line 26, the comparator 16 provides a dump signal on a line 28 which causes switch 18 to close, thereby dumping the charge stored within the capacitance of the phase modulator. The energy may be dissipated through the internal resistance of the switch.

Figures 2, 2A:
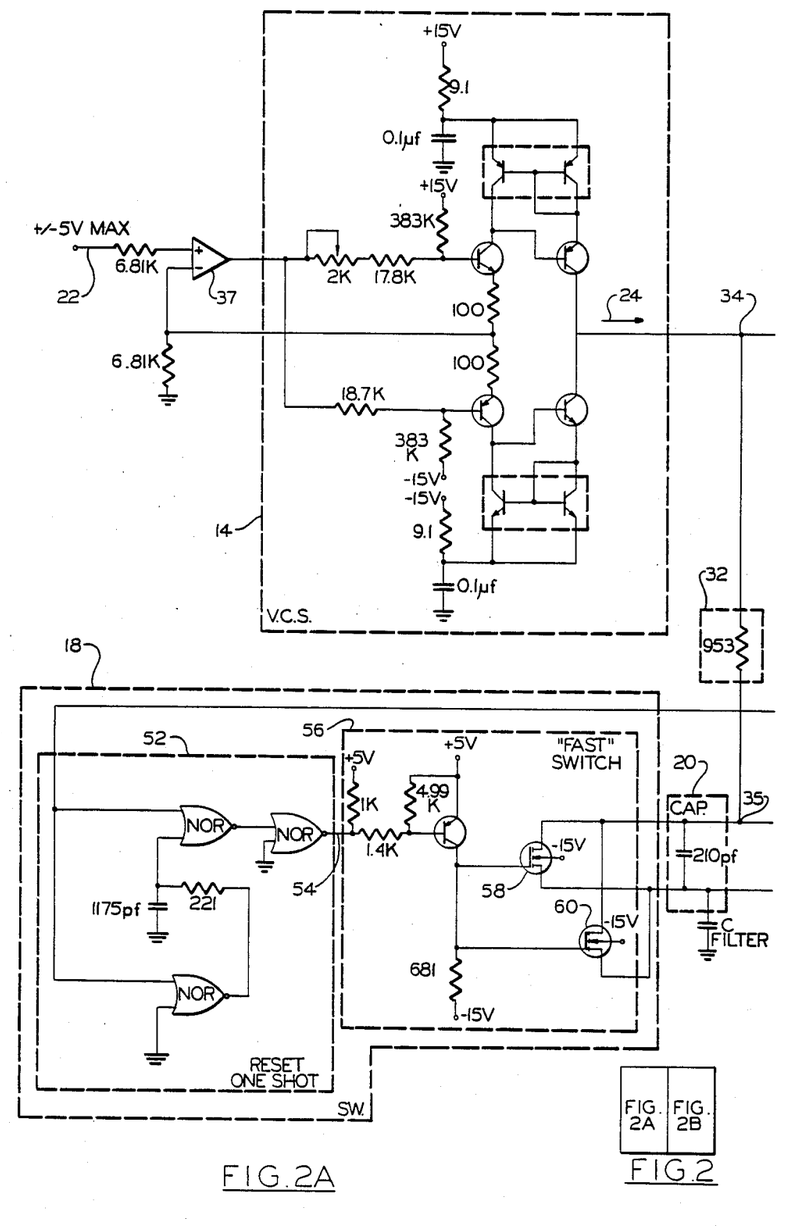
Figure 2B:
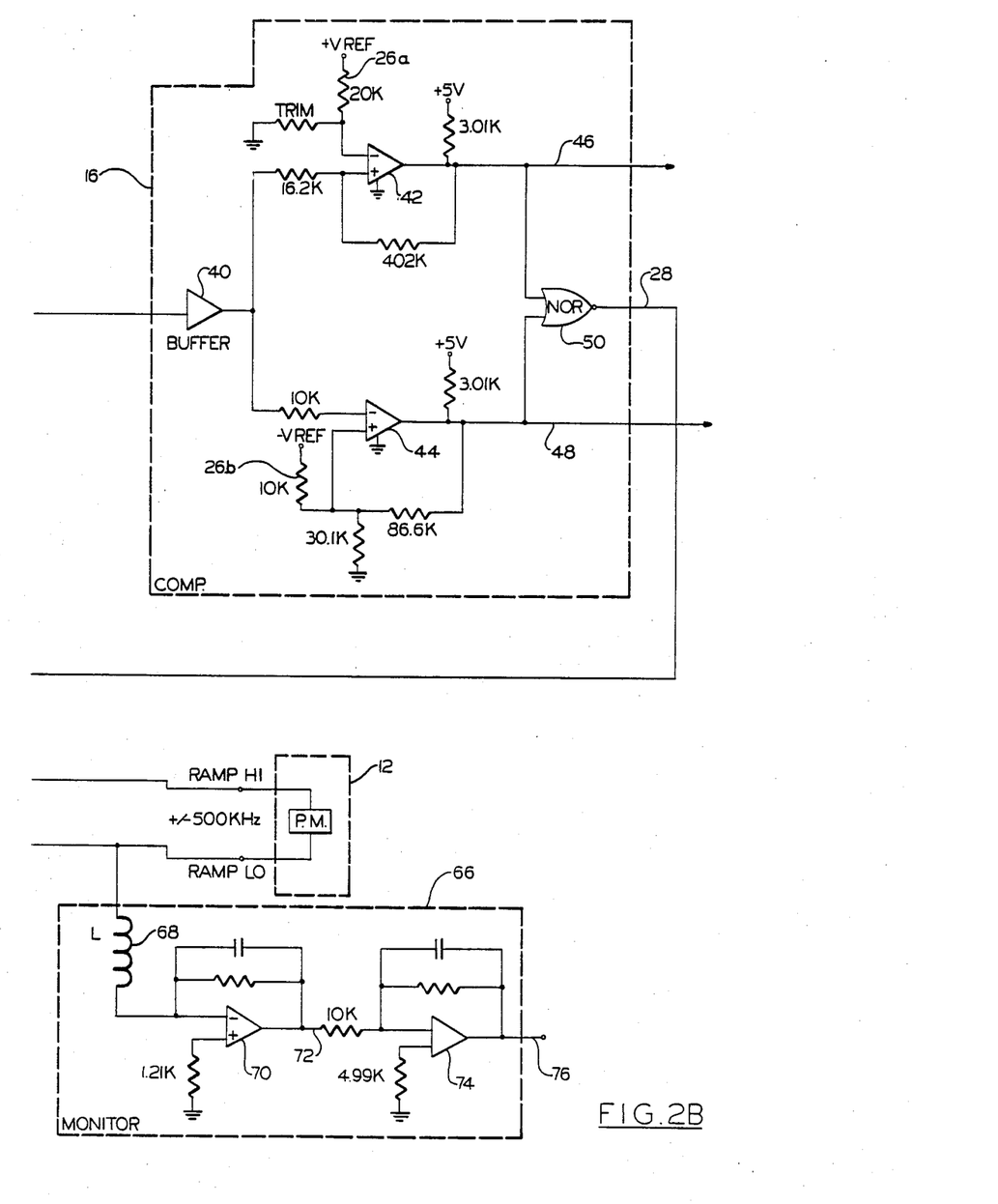

FIG. 2 is a detailed schematic block diagram of a preferred embodiment of the invention as applied to a fiber optic gyro application, using the same reference numerals as used in FIG. 1. In addition to all the same components shown in FIG. 1, however, an additional component is shown comprising an overshoot compensation resistor 32 also shown in FIG. 1, but in a disconnected manner, which could be hooked up in FIG. 1 between a node 34 and a node 35 by removing a jumper 36.

Beginning in FIG. 2 with a bipolar voltage signal on line 22 which may vary between minus and plus 5 volts, a buffer 37 buffers that signal and provides it to the high output impedance variable current source 14 which may typically comprise, without limitation, various transistors connected in a manner known in the art to form a high impedance, as viewed from node 34. The source 14 illustrated in the Figure provides current of either polarity which varies in magnitude din response to the magnitude of the signal on the line 22 from plus to minus 735 microamps on line 24, respectively, into or out node 34.

This current is delivered to the capacitance inherent in the integrated optic phase modulator 12 and, if desired, to the additional capacitor 20 to produce either a positive or negative ramping voltage at node 34. The voltage at node 34 ramps up (in an absolute sense) in order to ultimately be compared to a pair of reference voltages on a pair of lines 26a and 26b.

The comparator 16 includes a buffer 40 which presents a high impedance input to node 34 and provides the ramping voltage thereon to each of two comparators 42, 44, one of which will be eventually triggered when the voltage magnitude of either the positive or negative ramping signal at node 34 exceeds (again, in an absolute sense) the reference voltage on line 26a or 26b. At that point, one or the other of a pair of lines 46, 48 will provide an output signal to a NOR gate 50 which provides the dump signal on line 28 to switch 18. The recurring signals on lines 46, 48 can be provided to an up-down counter or frequency counter for respectively relating the frequency of recurrence to absolute angle or angular rotation rate, as desired.

The dump signal, although of shorter duration than the period of the sawtooth, will be of rather long duration, being at least as long as the time it takes from the onset of the dump signal to the time the capacitor discharges enough for the appropriate comparator to sense it is less than the reference and to shut off its output. In order to convert this overlong signal to a much shorter pulse, the signal on line 28 is provided first to a "reset" one-shot circuit 52 which, in response thereto, provides a short duration signal pulse on a line 54 which, in the embodiment shown, may last for perhaps 40 nanoseconds or thereabouts. This fast signal pulse on line 54 permits a "fast" switch 56 to very quickly, with low resistance, dump the charge on the phase modulator 12 into the parallel resistance of a pair of switches 58, 60 where the stored energy is dissipated. As mentioned, a capacitor 20 may also be provided in parallel with the capacitance of the phase modulator 12 in order to provide a sufficient level of current with which to work. In other words, without capacitor 20, the level of current on line 24 might be something on the order of less than 100 microamps which would be more difficult to work with in terms of accuracy.

An important teaching of the present invention is the use of the resistor 32 inserted between node 34 and node 35 in order to automatically correct for the circuit propagation delay. The value of the resistance may be calculated by first determining the various component propagation delays between node 34, through the comparator 16, through the switch 18 to node 35. This could be characterized as $$V_{error} = [(i)(\Delta t_{delay})]/c,$$

where
i = the current through the resistor,
$\Delta t_{delay}$ = the propagation delay from node 34 to node 35, and
c = the capacitance of the phase modulator plus the capacitor 20.

Since $V_{error} = i \times R$, the desired resistance (R) equals the delta time delay divided by capacitance. Thus, for the circuit shown in the embodiment of FIG. 2, the time delay from node 34 to 35 through the comparator and switch is approximately 219 nanoseconds (assuming the capacitance of the phase modulator is 20 pF). Applicants calculated the delay by consulting the manufacturers' specifications for the various propagation delays of the various devices. The degree of overshoot caused by the delay, as a percentage of the variable frequency sawtooth's period will increase as the sawtooth frequency increases at higher rotational rates. Since the propagation delay is fixed and the period of the sawtooth is variable, the overshoot error will vary and become more significant at higher frequencies. For a maximum ramp rate of 500 kHz this delay would represent a very substantial portion of the ramp period. The presence of the resistor 32 automatically compensates for any overshoot of the ramp voltage by making the voltage at node 34 higher (in an absolute sense) than that at node 35, thereby "fooling" the comparator 16 into "thinking" the ramp voltage (on the total capacitance represented by capacitors 12, 20) reaches the trigger point sooner than it really does. The "sooner" is exactly equal to the electrical propagation delay regardless of the frequency of the sawtooth. This effect occurs by virtues of the increase or decrease in the level of current due to an increased or decreased slope in the sawtooth automatically increasing the voltage across the compensating resistor exactly commensurate with any change in the slope of the ramping current. Thus, although changes in the sawtooth frequency will alter the portion of the sawtooth period represented by the propagation delay, such alterations are automatically compensated for by the increasing or decreasing current in the compensating resistor 32.

FIG. 2 also shows a second method of monitoring the rotation rate by means of a monitor 66 which comprises an inductor 68 which provides a continuous stream of current to a current to voltage converter 70 which provides a voltage signal on a line 72 to a voltage amplifier 74 which in turn provides an amplified output signal on a line 76 which may be fed to a voltage to frequency converter in order to indicate rate directly. This method of monitoring rate using the monitor 66, the method described previously where the signals on lines 46 and 48 are monitored, or some other method may be used.

Figure 3:
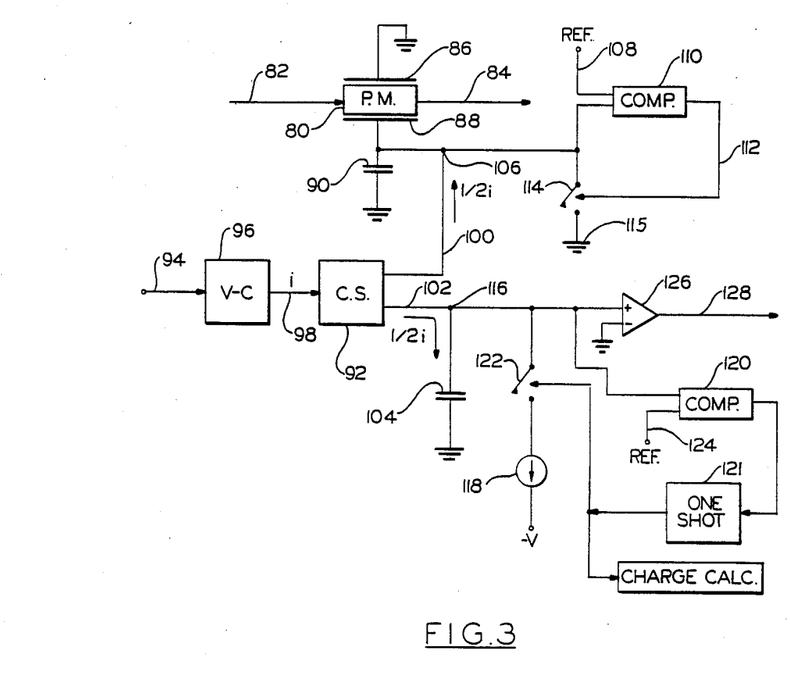
FIG. 3 illustrates hardware embodying a current measuring technique, according to the third aspect of the present invention.

FIG. 3 is a simplified block diagram illustration of a circuit employing a measurement technique according to the third aspect of the present invention which is shown for but not limited to a gyro application. A phase modulator 80 is shown responsive to an input light signal on a line 82 which passes therethrough and is provided as an output light signal on a line 84 after being modulated according to the voltage across the "plates" 86, 88 of the capacitance inherent in the phase modulator. The voltage across these plates 86, 88 is controlled directly by the voltage on a capacitor 90 which stores charge delivered from a variable current splitter source 92 as controlled by a control signal on a line 94 provided to a voltage to current converter 96 which provides the command signal on line 94 in the form of a current (i) command signal on a line 98 to the variable current splitter source 92. It should be realized that the capacitor 90 may be omitted in favor of simply using the capacitance of the phase modulator alone, as described previously in connection with FIGS. 1 & 2.

The variable current splitter source 92 provides two output currents on lines 100, 102 which have identical magnitudes. In other words, the output current is split in half, the half on line 100 being delivered to capacitor 90 for storage therein (and in the capacitance of the phase modulator 80) and the other half is delivered for storage to another capacitor 104.

The capacitor 90 and the capacitance of the phase modulator are in parallel and serve to accumulate the current on the line 100 until the voltage at a node 106 exceeds a reference voltage on a line 108 wherein a comparator 110 then provides a dump signal on a line 112 to a switch 114 which dumps the charge in the capacitor 90 to ground 115. This half of the circuit works in a similar fashion as that described for FIGS. 1 and 2.

However, the second half of the circuit is different in that it takes half of the current from the variable current source 92 and stores it in a capacitor 104 which has a voltage at a node 116 which is indicative of the amount of charge stored not only in capacitor 104 but also in the parallel capacitance of capacitor 90 and phase modulator 86. Since the charge is the same in the two branches, the voltage at node 106 may be inferred by means of using a simple ratio of the total capacitances in each branch without having to experience the discontinuity introduced by resetting the ramp. In other words, current may be drawn out of capacitor 104 by a constant current source 118 for a selected time period under the control of a comparator 120, a one-shot 121 and switch 122 which together cause charge to be drawn out of the capacitor at a constant rate for the duration of the one-shot's constant width pulse whenever a selected reference voltage on a line 124 is exceeded by the voltage on node 116. By drawing charge out at a controlled rate for a known duration, the same amount of charge is taken out each sample period. If totalized, this charge serves to indicate the total amount of the rotation angle experienced by the gyro. And angle information can be used purely for itself or related to time to give a rotation rate. Thus the rotation angle or rate may be measured in a way which is independent of thresholds. This has the advantage of freedom from dependency on a voltage reference, comparator threshold levels and other variations in the reset point of the ramp. Instead, the dependencies are on the current source and stabilities of the capacitors used. It is thus a fundamental teaching of the present invention that charge stored on the integrated optic phase modulator, by way of the capacitance, is a measure of the rotation angle of the gyroscope. Although the circuit shown in FIG. 3 only illustrates a unidirectional measurement technique it should be understood that the teachings may readily be applied to extend the circuit to make it bidirectional in a manner similar to the way in which the circuit of FIG. 2 is bidirectional. Additionally, an amplifier 126 may be used to provide the voltage on line 116 on a line 128 for a data extraction device similar to those already described.

Figure 4:
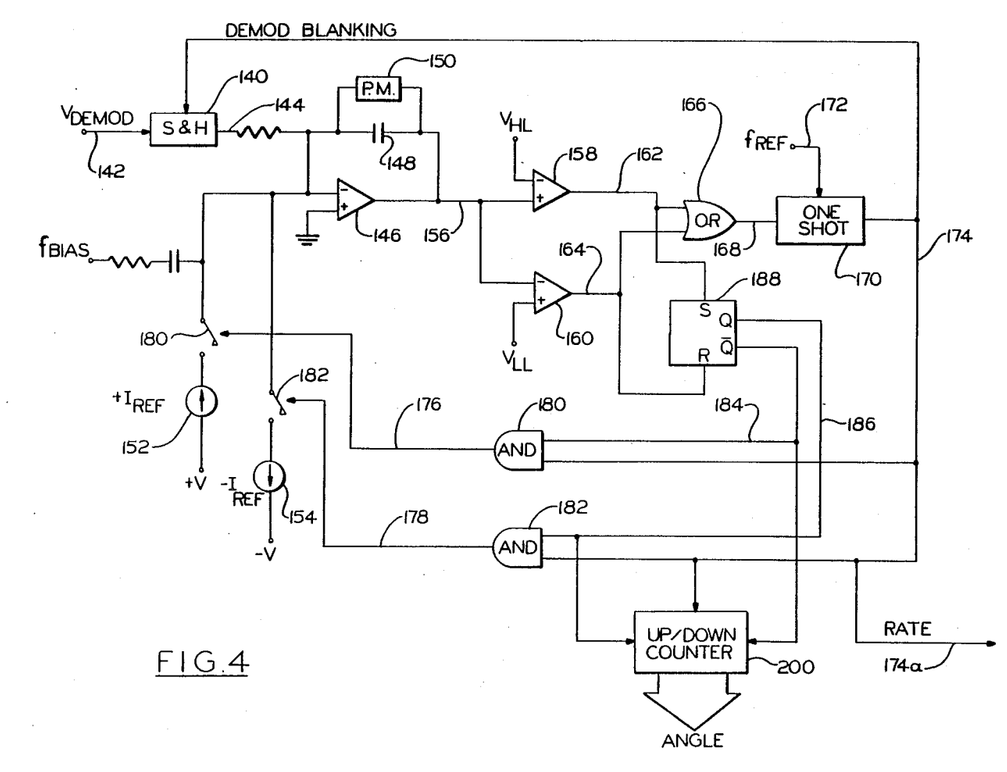
FIG. 4 shows another embodiment of a current measurement scheme, according to the third aspect of the present invention.

FIG. 4 shows an embodiment of a measurement scheme according to the third aspect of the present invention. The embodiment shown is for a fiber optic gyro application but the invention is not restricted to gyro applications. The circuit of FIG. 4 also embodies a fiber optic gyro nulling function.

A sample and hold circuit 140 is responsive to a phase nulling signal on a line 142 which is provided on a line 144 to an integrator comprising an opamp 146, a capacitor 148 and an integrated optic phase modulator 150. This arrangement of using an integrated optic phase modulator as part of an opamp integrator differs from the prior art in that there is no discharge switch across the phase modulator. Instead, a pair of oppositely poled constant current sources 152, 154 are used to draw current off of the phase modulator 150 and the capacitor 148. This is done, according to the third aspect of the present invention, by sensing the output of the integrator at a node 156 with a pair of comparators 158, 160 which respectively sense upper and lower limits of allowable charge accumulation on the parallel capacitor pair 148, 150. Upon sensing either of these upper or lower limits a signal on a line 162 or 164 is provided to an OR gate 166 which in turn provides an output signal on a line 168 to a digital one-shot 170. A frequency reference signal on a line 172 is provided to the one-shot. The one-shot provides an output pulse of known duration on a line 174 to the sample and hold circuit 140 for the purpose of holding the signal on line 144 to its magnitude just prior to receiving the pulse on line 174. This serves the purpose of blanking the error signal on line 142 for the brief period of time during which current is drawn off of capacitors 148, 150 by one or the other of constant current sources 152, 154 in response to either a signal on a line 176, or 178 which will briefly close either a switch 180 or a switch 182. The signals on lines 176, 178 are provided, respectively, by AND gates 180, 182 which are each responsive to the signal on line 174 from the one-shot 170 and also to a pair of signals 184, 186 from a flip-flop 188 which is responsive to the comparator output signals on lines 162, 164 as shown. The flip-flop 188 provides the signals on lines 184, 186 in order to enable one or the other of the AND gates 180, 182 prior to both receiving the pulse on the line 174.

As mentioned above, a serrodyne modulation technique in which a phase modulator is used in a opamp integrator and where a switch is used in parallel with the phase modulator in order to discharge the stored charge during the reset period of the sawtooth is known in the prior art. The prior art approach would be to blank out the gyro during the reset period in order to avoid disturbances due to switching. This technique is also used in FIG. 4 as shown by the sample and hold circuit 140 which is used to blank out the error on the line 142 during the reset period. It will be understood that during this blanking period it is assumed that the parameter being measured, such as angular rotation rate, remains constant. This is often an inaccuracy which may be tolerated for some applications.

Unlike the prior art approach, however, FIG. 4 shows no switch across the phase modulator for discharging accumulated charge during reset. Instead, an entirely new measurement approach is used which takes advantage of the greater stabilities achievable with current sources as opposed to voltage comparators at high frequencies. At such frequencies, fast comparators tend to lose some of the accuracies which are achievable with their slower counterparts. By using the constant current sources 152, 154 to repetitively draw a charge off of the capacitors 148, 150 in constant quantity "packets," each occurrence of the pulse on the line 174 in conjunction with the enabling signal on line 186 or 184 serves as a directly proportional indication of the amount of angle rotated by the gyro which may be totalized by an up/down counter 200. Similarly, the gyro's rate may be determined by counting the number of pulses on the line 174 with respect to time as indicated by a signal on a line 174a.

Thus, by viewing the phase modulator 150 as a repository of angle information, in the form of charge, a new measurement technique may be employed to draw that current off in a controlled fashion and achieve a much more reliable indication of rotation.

Although the invention has been shown and described with respect to a best mode embodiment thereof, it should be understood by those skilled in the art that the foregoing and various other changes, omissions, and additions in the form and detail thereof maybe made therein without departing from the spirit and scope of the invention.

We claim:

1. Apparatus, comprising:
    means for providing a pair of counterpropagating light signals;
    a capacitive integrated optic phase modulator, for changing the phase of the counterpropagating light signals passing through said modulator according to the voltage across said modulator;
    a switch connected in parallel with said modulator;
    a current source, responsive to a control signal, connected in series with said modulator, for providing a variable amount of current to said modulator, thereby increasing the voltage across said modulator;
    a voltage comparator, for providing a discharge signal to close said switch in response to the voltage across said modulator exceeding a predetermined value, thereby discharging said modulator and decreasing the voltage across said modulator to substantially zero;
    means for providing said control signal for adjusting the variable amount of current provided by said current source, thereby adjusting the rate of voltage increase across said modulator in a manner to null the phase difference between the counterpropagating light signals; and
    measuring means, for measuring the amount of current provided by said current source; whereby the amount of current required for phase nulling the counterpropagating light signals is indicative of the relative effective lengths traversed by the counterpropagating light signals.

2. Apparatus, according to claim 1, wherein said measuring means is comprised of:

a current splitter, connected in series with said current source, having a first output for providing a first current to said phase modulator and having a second output for providing a second current to said measuring means, wherein the magnitude of said first current is proportional to the magnitude of said second current;

a capacitor, connected in series with the second output of said current splitter;

discharge means, for gradually discharging said capacitor in response to said discharge signal; whereby gradually discharging said capacitor provides for an accurate measurement of the amount of current provided by said current source.

3. Apparatus, comprising:

means for providing a pair of counterpropagating light signals;

a capacitive integrated optic phase modulator, for changing the phase of the counterpropagating light signals passing through said modulator according to the voltage across said modulator;

a resistor connected in series with said modulator;

a switch connected in parallel with the series combination of said modulator and said resistor;

a current source, responsive to a control signal, connected in series with said modulator and said resistor, for providing a variable amount of current to said modulator and said resistor, thereby increasing the voltage across said modulator;

a voltage comparator, for providing a discharge signal to close said switch in response to the voltage across said modulator exceeding a predetermined value, thereby discharging said modulator and decreasing the voltage across said modulator to substantially zero;

means for providing said control signal for adjusting the variable amount of current provided by said current source, thereby adjusting the rate of voltage increase across said modulator in a manner to null the phase difference between the counterpropagating light signals; and measuring means, for measuring the amount of current provided by said current source; whereby the amount of current required for phase nulling the counterpropagating light signals is indicative of the relative effective lengths traversed by the counterpropagating light signals.

4. Apparatus, according to claim 3, wherein said measuring means is comprised of:

a current splitter, connected in series with said current source, having a first output for providing a first current to said phase modulator and having a second output for providing a second current to said measuring means, wherein the magnitude of said first current is proportional to the magnitude of said second current;

a capacitor, connected in series with the second output of said current splitter;

discharge means, for gradually discharging said capacitor in response to said discharge signal; whereby gradually discharging said capacitor provides for an accurate measurement of the amount of current provided by said current source.

5. Apparatus, comprising:

means for providing a pair of counterpropagating light signals;

a capacitive integrated optic phase modulator, for changing the phase of the counterpropagating light signals passing through said modulator according to the voltage across said modulator;

a first current source, responsive to a first control signal, connected in series with said modulator, for providing a variable amount of current to said modulator, thereby increasing the voltage across said modulator;

a second current source, responsive to a second control signal, connected in series with said modulator, for removing a variable amount of current from said modulator, thereby decreasing the voltage across said modulator;

a voltage comparator, for providing a first signal to said first current source in response to the voltage across said modulator being less than a first predetermined value, and for providing a second signal to said second current source in response to the voltage across said modulator exceeding a second predetermined value, thereby increasing the voltage across said modulator by providing said first signal and decreasing the voltage across said modulator by providing said second signal;

means for providing said first and second control signals for adjusting the variable amount of current provided by said first and second current sources, thereby adjusting the rate of voltage increase across said modulator in a manner to null the phase difference between the counterpropagating light signals; and measuring means, for measuring the amount of current provided by said first and second current sources; whereby the amount of current required for phase nulling the counterpropagating light signals is indicative of the relative effective lengths traversed by the counterpropagating light signals.

* * * * *